United States Patent [19]

Ho

[11] Patent Number: 4,924,318

[45] Date of Patent: May 8, 1990

[54] LATTICE ELIMINATION ASSEMBLY FOR A TELEVISION WALL

[76] Inventor: Ji S. Ho, 6 Fl., No. 162, An Ho Rd., Taipei, Taiwan

[21] Appl. No.: 366,474

[22] Filed: Jun. 15, 1989

[51] Int. Cl.$^5$ .............................................. H04N 5/65
[52] U.S. Cl. .................................... 358/250; 358/87; 358/242; 358/254
[58] Field of Search ................ 358/87, 183, 242, 254, 358/250, 251, 252, 253, 255

[56] References Cited

U.S. PATENT DOCUMENTS

| | | | |
|---|---|---|---|
| 3,909,525 | 9/1975 | Fagan | 358/87 |
| 4,368,485 | 1/1983 | Midland | 358/242 |
| 4,475,126 | 10/1984 | Akins | 358/250 |
| 4,635,105 | 1/1987 | Favreau | 358/242 |
| 4,734,779 | 3/1988 | Levis | 358/87 |
| 4,746,981 | 5/1988 | Nadan | 358/183 |
| 4,757,626 | 7/1988 | Weinreich | 358/250 |

*Primary Examiner*—Howard W. Britton
*Attorney, Agent, or Firm*—Bacon & Thomas

[57] ABSTRACT

A lattice elimination assembly for a television wall, e.g., a pile of televisions arranged in a matrix shape, includes a number of partition plates disposed in front of the television wall, and a number of convex lenses supported by the partition plates with one convex lens located in front of every television. The partition plates separate every two adjacent televisions from interfering with each other. The lenses are integrally formed together so as to form a full and perfect screen for the television wall.

7 Claims, 2 Drawing Sheets

LATTICE ELIMINATION ASSEMBLY FOR A TELEVISION WALL

FIELD OF THE INVENTION

The present invention relates to a lattice elimination assembly, and more particularly to a lattice elimination assembly for a television wall.

BACKGROUND OF THE INVENTION

Television wall, a pile of televisions arranged in a cubic shape, is widely used for advertising purposes. Each television could display a full picture, or every television displays a relative section of the picture so as to form an enlarged picture altogether. This is particularly suitable for advertising at a busy city or serving as a displayer in a concert.

Normally, a frame is formed on the perimeter of a television displayer. This seriously affects the picture when each television displays only one section of the picture. The whole picture is separated by such frames into a lattice picture which gives the television viewers a bad vision.

The present invention has arisen to mitigate and/or obviate the afore-described disadvantages of the conventional television wall.

SUMMARY OF THE INVENTION

The primary object of the present invention is to provide a lattice elimination assembly for a television wall which gives an enlarged smooth picture when each television of the television wall displays only one respective section of the picture.

The present invention seeks to provide a lattice elimination assembly for a pile of televisions arranged in a matrix shape including a member of partition plates disposed in front of the television wall, and a number of convex lenses supported by the partition plates with one lens located in front of each television. The partition plates separate every two adjacent televisions from interfering with each other. The lenses are integrally formed together so as to form a full and perfect screen for the television wall.

Further objects and advantages of the present invention will become apparent from a careful reading of the detailed description provided hereinbelow, with appropriate reference to the accompanying drawings.

DETAILED DESCRIPTION OF THE INVENTION

Figure 1:
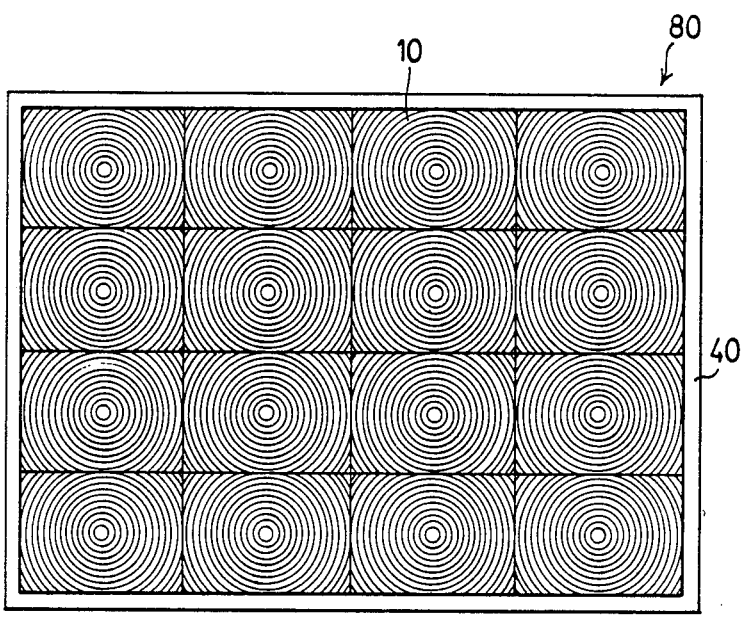
FIG. 1 is a front elevational view of a television wall in accordance with the present invention.

Referring to the drawings, the lattice elimination assembly for a television wall 80 in accordance with the present invention is generally installed in front of the television wall 80.

The television wall 80 is composed of sixteen televisions 20 arranged in a four by four matrix form and accommodated within an outer frame 40. Every two adjacent televisions 20 have a space frame 22 disposed therebetween. These space frames 22 and a frame (not shown) of each television around the displayer thereof form a lattice picture and seriously affect the picture displayed by the television wall when every television displays only one section of the picture so as to form a full picture altogether. The outer frame 40 extends forward a substantial length.

The lattice elimination assembly in accordance with the present invention is generally comprising a number of partition plates 30 and a number of convex lenses 10. Each partition plate 30 is integrally attached to every space frame 22 and extends forward of the television wall so as to support one of the convex lenses 10 in front of every television 20. The space frame 30 is tapered toward the front end thereof. A half partition plate 32 is also attached to the inner side of the outer frame 40 if required. The partition plates 30 absorb lights and prevent the lights from passing therethrough so as avoid the interference between the televisions.

Figure 2:
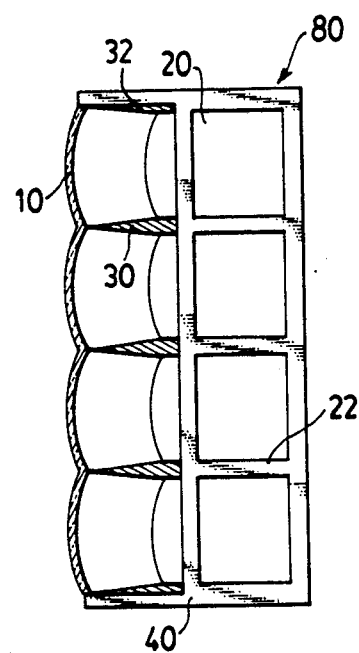
FIG. 2 is a side view of the television wall of FIG. 1.

Referring again to FIG. 2, it can be seen that the convex lenses 10 are generally an integral lens with multiple units of convex lenses and supported by the partition plates 30 so that the picture displayed on every television 20 can be projected to the convex lens unit 10 located before the respective television 20. Besides, the convex surfaces of the lenses distribute the lights and eliminate the reflection of the external lights.

In addition, the convex lenses 10 can be tinted or applied with radiation prevention materials so as to eliminate the radiations and the strong lights produced by the televisions. Alternatively, the lenses 10 are composed of a number of single lens unit and integrally connected together. The number of the televisions is a square number, such as 4, 9, 16, 25 ... etc., of the natural number except one.

Accordingly, the present invention has the following advantages:

(a) A full and perfect picture is achieved by the televisions 20 of the television wall 80 in accordance with the present invention when every television 20 displays only one section of the picture.

(b) A screen without any reflection.

(c) No interference occurs between the adjacent televisions 20.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lattice elimination assembly for a television wall, said television wall having a pile of televisions substantially arranged in a matrix shape; said lattice elimination assembly comprising a number of partition plates disposed in front of said television wall, and a convex lens being supported by said partition plates in front of every television; said partition plates separating every two adjacent televisions from interfering with each other, and said lenses being integrally connected together so as to form a full and perfect screen thereof.

2. A lattice elimination assembly of claim 1, wherein each partition plate tapers forward of the television wall and the partition plates support said lenses at a front end thereof.

3. A lattice elimination assembly of claim 1, wherein said lenses are substantially an integral lens with a number of convex lens units formed integrally together.

4. A lattice elimination assembly of claim 1, wherein an outer frame is provided for accommodating said televisions so as to form said television wall.

5. A lattice elimination assembly of claim 4, wherein said outer frame extends forward of said television wall so as to support said lenses.

6. A lattice elimination assembly of claim 4, wherein a number of space frames are disposed with one between every two adjacent televisions.

7. A lattice elimination assembly of claim 6, wherein one partition plate is attached to one space frame.

* * * * *